United States Patent [19]

Johansson

[11] 4,191,915
[45] Mar. 4, 1980

[54] DOOR OPERATING APPARATUS

[76] Inventor: Tryggve J. Johansson, Oloupersvagen 23, Älvängen, Sweden, 44600

[21] Appl. No.: 836,970

[22] Filed: Sep. 27, 1977

[30] Foreign Application Priority Data

Mar. 28, 1977 [SE] Sweden ............... 7703512

[51] Int. Cl.² ............................... H02P 3/00
[52] U.S. Cl. .................. 318/464; 318/484;466; 318/466
[58] Field of Search ............... 318/461, 463, 464, 467, 318/469, 484, 466

[56] References Cited
U.S. PATENT DOCUMENTS 2,713,138   7/1955   Lanfers et al. .............. 318/464

OTHER PUBLICATIONS

Montgomery Ward Residential Automatic Garage Door Opener Owners Manuel, 9-70.

Primary Examiner—David Smith, Jr.

[57] ABSTRACT

A reversible motor operates a vertically movable door through transmission means including a friction clutch. Control means receiving the output of a tachometer generator driven by the driven member of the friction clutch are arranged to switch off the motor automatically in response to a predetermined deviation downwards of the rate of rotation caused by an obstruction in the path of the door. The system may include means for automatically re-starting the motor in the opposite direction subsequent to a switching-off caused by an obstruction to the travel downwards of the door.

1 Claim, 1 Drawing Figure

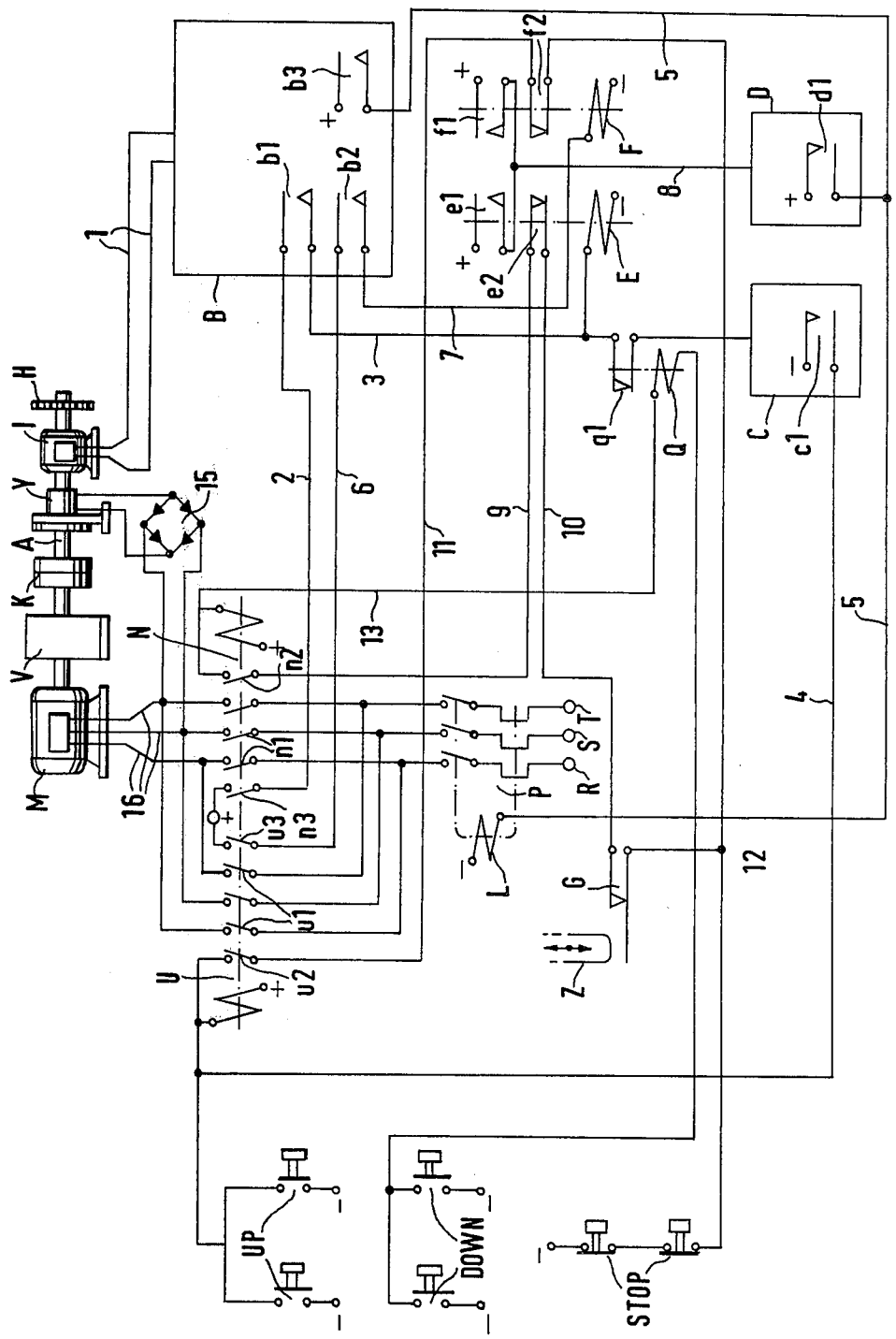

DOOR OPERATING APPARATUS

BACKGROUND OF THE INVENTION

This invention relates to apparatus for operating a vertically movable door of the type comprising an electric motor, a friction clutch comprising a driving member and a driven member, first transmission means connecting the motor with said driving member and second transmission means connecting said driven member with the door. The friction clutch has for its principal purpose to set an upper limit to the torque transmitted and thus to prevent the door from exerting an excessive pressure upon a person or an object caught between the lower edge of the descending door and the foot of the doorway. It is also known to supplement apparatus of this type with a braking mechanism arranged to act on said second transmission means, and means for automatically controlling said braking mechanism including means for sensing the rotation of a rotary part of said second transmission means, said sensing means being arranged to render the braking mechanism operative when the rate of rotation deviate upwards or downwards from a predetermined range. This system results in a checking of further motion of the door as soon as the slowing down of the rotation caused by an obstacle in the path of the descending door is sufficient to make the sensing means operate the braking mechanism. While this action is desirable for safety reasons, the known system has the disadvantage that the motor will continue operating the driving member of the friction clutch the driven member of which is kept at a standstill by the braking mechanism, until somebody pushes the stop button to switch off the motor, or until the overload switch of the motor is released by the action of the overload caused by the operation of the slipping friction clutch.

SUMMARY OF THE INVENTION

The improved apparatus according to the present invention comprises an electric motor, circuit means including switch means for connecting the motor to a source of power, a friction clutch comprising a driving member and a driven member, first transmission means connecting the motor with said driving member, second transmission means connecting said driven member with the door, means for sensing the rotation of a rotary part of said second transmission means, control means responsive to the sensing by said sensing means of a deviation of the rate of rotation downwards from a predetermined range, and operating means for said switch means arranged to be controlled by said control means so as to cause said switch means to switch off the motor on the sensing by said sensing means of said deviation.

In a preferred form of the apparatus according to the invention which includes a stop member arranged to prevent the door from moving beyond a predetermined terminal position, the means above defined for causing the motor to be switched off on the detection by said sensing means of a slowing down of the rotation of said second part of the transmission means also constitute automatic means for switching off the motor from the source of power on arrival of the door to said terminal position. This system not only renders the usual provision of a limit switch for the terminal position in question superfluous but also has the more important advantage that the functioning of the rotation sensing means and the means controlled by the same are subjected to a regular checking by the normal operation of the door.

The above features as well as other new and favourable features within the invention will now be described and explained in more detail with reference to the appended drawing.

DESCRIPTION OF THE DRAWING

The single FIGURE of the drawing schematically represents a preferred embodiment of the invention.

DESCRIPTION OF THE PREFERRED EMBODIMENT

The apparatus shown in FIG. 1 is designed for the operation of a door of the type consisting of a flexible curtain, for instance composed of jointed slats or panels, sliding in vertical guides at both sides of the doorway. When the door is opened, said curtain may either be wound up successively on a drum rotatable about a horizontal axis above the doorway or (more usually) successively pushed or pulled inwards along substantially horizontal guides provided behind the doorway and forming a continuation inwards of the vertical guides. The drive mechanism comprises a three-phase motor M driving an intermediate shaft A through transmission means including a reduction gear V and a friction clutch K. The drive is transmitted from a cogwheel H attached to the intermediate shaft A to the door through additional transmission means (not shown) which may be of a known type and require no description. The motor M can be connected to three-phase mains RST through contacts in the protector switch P and one or the other of two contactors N and U. The contactor N causes the motor to rotate in the direction resulting in closing of the door (movement downwards). The contactor U causes the motor to rotate in the direction resulting in opening of the door (movement upwards). The contactors are preferably provided with mechanical coupling or blocking means arranged to prevent switching on of more than one contactor at a time. The protector switch P is provided with bimetal elements arranged to release the switch when subjected to an over-current, and also with a releasing magnet having a coil L the energizing circuit and the purpose of which will be described presently.

A brake Y acting on the intermediate shaft A is arranged to be maintained in the active state by a spring and to be released by means of a magnet the energizing coil of which is connected through a rectifier 15 to two of the conductors 16 connected to the motor terminals. By this arrangement, the spring will render the brake operative as soon as the motor is switched off.

The movable contacts of the contactor N include, in addition to the three motor current contacts n1, a holding contact n2, and a signal contact n3. The movable contacts of the contactor U likewise include, in addition to the motor current contacts u1, a holding contact u2 and a signal contact u3.

The control circuits for the contactors include three pairs of push-button contacts UP, DOWN and STOP, the functions of which are explained by their designations. All of said push-button contacts are of the type springing back into the nonoperative position when not actuated. The points in the diagram marked with a plus sign or a minus sign are connected to the positive and negative terminal, respectively, of an auxiliary source of D.C. current.

The intermediate shaft A is provided with a tachometer generator I producing an output signal depending on the rate of rotation of the shaft A. Said output signal may, for instance, consist of one or more inductively or photo-electrically generated pulses per turn of the shaft A, or of a direct current varying with the rate of rotation of the shaft. The output signal of the tachometer generator is supplied through a pair of conductors 1 to the input terminals of a rate of rotation monitoring device B arranged to respond both to the tachometer signal produced when the rate of rotation of the shaft A exceeds a predetermined upper limit and to the tachometer signal produced when the rate of rotation is below a predetermined lower limit. Said upper and lower limits are higher and lower, respectively, than the normal rate of rotation of the shaft A occurring when said shaft is driven without slipping by the friction clutch K. For brevity's sake, the expressions "under-normal rate of rotation" and "over-normal rate of rotation" are used below to denote rates of rotation below and above, respectively, the limits referred to.

The rate of rotation monitoring device responds to an under-normal rate of rotation by closing a pair of switches b1 and b2 and responds to an over-normal rate of rotation by closing a switch b3. One terminal of the switch b1 is connected by a conductor 2 to one terminal of the signal contact n3. The other terminal of the switch b1 is connected by a conductor 3 to one terminal of the winding of a relay E and also to one terminal of the break contact q1 of a slow-to-drop relay Q. The other terminal of the winding of the relay E is connected to the negative terminal of the auxiliary source. The break contact q1 connects the conductor 3 to the input of a time circuit C arranged to close a switch c1 at the end of a predetermined, comparatively short period (for instance 1 second) following upon the supply of a positive pulse to the input terminal of the time circuit. The circuit containing the series connection of the signal contact n3 and the switch b1 constitutes an AND gate the output of which is connected to the time circuit C (on condition that the break contact q1 is closed) and the inputs of which are constituted by said signal contact n3 and said switch b1. The winding of the slow-to-drop relay Q is connected in series with the push-button contacts DOWN. A conductor 4 connects the switch c1 in parallel with the push-button contacts UP. A conductor 6 connects one terminal of the switch b2 to one terminal of the signal contact u3. The other terminal of the signal contact u3 as well as the corresponding terminal of the signal contact u3 is connected to the positive terminal of the auxiliary source. A conductor 7 connects the other terminal of the switch b2 to one terminal of the winding of a relay F the other terminal of which is connected to the negative terminal of the auxiliary source.

The relays E and F are each provided with a make contact e1, f1, respectively, and a break contact e2, f2, respectively. One terminal of both of the make contacts e1, f1 is connected to the positive terminal of the auxiliary source. The other trminals of said make contacts are connected by a common conductor 8 to the input of a time circuit D arranged to close a switch d1 as soon as a positive potential has been supplied to the input conductor 8 during an uninterrupted period of a predetermined duration, for instance 5 seconds. If the supply of the positive potential is interrupted after a period shorter than the predetermined one, the time circuit D will be zeroized immediately. The closing of the switch d1 connects the positive terminal of the auxiliary source to a conductor 5 connected to one terminal of the release coil L of the motor protector switch P, the other terminal of which is connected to the negative terminal of the auxiliary source. Conductors 9, 10 connect the break contact e2 in series with the holding contact n2 of the contactor N and a limit switch G arranged to be opened by an actuating member Z when the door is arriving to its closed position. Said actuating member may, for instance, by an am or a bracket attached to the door, or it may be a member arranged to be driven by the drive mechanism of the door so as to reproduce the motion of the door on a reduced scale. One terminal of the break contact f2 is connected by a conductor 11 to the holding contact u2 of the contactor U, the other terminal of the break contact f2 being connected to the negative terminal of the auxiliary source by a conductor 12 in series with the push-button contacts STOP. The terminal of the limit switch G not connected to the conductor 10 is connected to said conductor 12.

The closing of the switch b3 of the monitoring device B connects the positive terminal of the auxiliary source to the conductor 5 above referred to.

The function of the apparatus will now be described. It is assumed that the motor protector switch P is closed and that the door is open. To close the door, the operator pushes one of the push-buttons DOWN. The push-button contact closes a circuit from the positive terminal of the auxiliary source through the winding of the contactor N, the conductor 13, the winding of the relay Q and the closed push-button contact DOWN to the negative terminal of the auxiliary source. The contactor N is operated and closes the motor current contacts n1 and the auxiliary contacts n2 and n3. The slow-to-drop relay Q is operated, causing its break contact q1 to disconnect the input of the time circuit C from the conductor 3. The motor starts driving the door downwards, causing the shaft A to be accelerated up to its normal rate of rotation within a short time. The holding contact n2 closes a holding circuit for the contactor N from the positive terminal of the auxiliary source through the winding of the contactor N, the holding contact n2, the conductor 9, the break contact e2 of the relay E, the conductor 10, the limit switch G and the series connected push-button contacts STOP to the negative terminal of the auxiliary source. The winding of the relay Q is deenergized; owing to the delayed drop of the relay, however, its break contact q1 remains open for a while. In the first moments following upon the operation of the contactor, that is, before the motor M and the shaft A have attained their normal rates of rotation, the switches b1 and b2 closed at under-normal rates of rotation remain closed, resulting in a flow of current in a circuit from the positive terminal of the auxiliary source through the signal contact n3 of the contactor N, the switch b1, the conductor 3 and the winding of the relay E to the negative terminal of the auxiliary source. The resulting operation of the relay E causes the break contact e2 of said relay to open the holding circuit of the contact N. Said holding circuit will, however, be closed again as soon as the motor has attained its normal rate of rotation, causing the monitoring device B to open its switch b1, whereby the relay E is deenergized and causes its contact e2 to close the holding circuit of the contactor N again. As the actions described occur within the time the push-button DOWN is kept depressed, the brief opening of the holding circuit of the contactor N has no effect. The starting process is terminated by the drop of the delayed relay Q, causing the break contact q1 of said relay to return to its closed position. The conductor 3 now carrying no potential, the closing of the contact q1 supplies no starting impulse to the time circuit C.

When the door arrives to its lower terminal position, the actuator member Z causes the limit switch G to open the holding circuit of the contactor N. The contactor N drops out, and the motor stops. The switches b1 and b2 of the monitoring device B return to their closed positions.

If the door in its downward movement should encounter an abnormal resistance, for instance caused by a person caught by the door, the following action will take place. The increased resistance causes the friction clutch K to slip. The maximum torque which can be transmitted by said clutch is so adjusted that the force exerted by the door cannot exceed a value harmless to a man, for instance 40 kilograms. As soon as the slipping of the clutch has caused the rate of rotation of the shaft A to drop below the lower limit to which the monitoring device B is arranged to react, said device closes its switches b1 and b2. The switch b1 closes an energizing circuit for the relay e extending from the positive terminal of the auxiliarly source through the signal contact n3 of the contactor N, the conductor 2, the switch b1, the conductor 3 and the winding of the relay E to the negative terminal of the auxiliary source. The relay E operates, causing its break contact e2 to open the holding circuit of the contactor N. The contactor drops out and the motor stops. The closing of the switch b1 also supplies a positive starting impulse to the input of the time circuit C through the closed break contact q1 of the relay Q. The time circuit C closes its switch c1 after the predetermined time, for instance 1 second, resulting in the closing of the energizing circuit of the winding of the contactor U extending from the positive terminal of the auxiliary source, the winding of the contactor U, the conductor 4 and the switch c1 to the negative terminal of the auxiliary source. The resulting operation of the contactor U starts the motor in the direction causing opening of the door. As soon as the motor approaches the normal rate of rotation, the monitoring device B opens its switches b1 and b2. The opening of b2 breaks the energizing circuit for the relay F which was closed by the signal contact u3 of the contactor U. The relay F drops out, causing its contact f2 to close a holding circuit for the contactor U extending from the positive terminal of the auxiliary source through the winding of the contactor U, the holding contact u2, the conductor 11, the contact f2, the conductor 12 and the series connected push-button switches STOP to the negative terminal of the auxiliary source. The switch c1 of the time circuit is opened again after a short period.

When the door has reached its upper terminal position, the motor has to be stopped. This is effected in the following way without the co-operation of a limit switch. A preferably resilient stop member is arranged to limit the upward movement of the door. When the door hits said stop member, the clutch K starts slipping. When the rate of rotation of the shaft A has descreased by a sufficient amount, the monitoring device B closes its switches b1 and b2. The switch b2 closes a circuit from the positive terminal of the auxiliary source through the signal contact of the contactor U, the conductor 6, the switch b2, the conductor 7 of the winding of the relay F to the negative terminal of the auxiliary source. The relay F operates, causing its break contact f2 to open the holding circuit of the contactor U. The contactor U drops out, and the motor stops. This system for stopping the motor at the end of the opening movement of the door has the advantage that the proper functoning of the tachometer generator I and the rate of rotation monitoring device B are checked every time the door is opened.

If the door during its upward travel should for some reason encounter an abnormal resistance, causing slipping of the coupling K, the motor will be stopped in the way just described.

The actions caused by the starting of the opening of the door by the operation of any of the push-button contacts UP and by the interrupting of the movement of the door by the operation of any of the push-button contacts STOP require no detailed description.

If the door during its travel upwards or downwards should be subjected to exterior forces acting in the direction in which the door moves and imparting to the door a speed exceeding the normal one, resulting in the shaft A being rotated at a rate exceeding the normal one, the monitoring device reacts by operating its switch b3 as soon as the rate of rotation exceeds the predetermined limit. The operation of the switch b3 closes a circuit from the positive terminal of the auxiliary source through the switch b3, the conductor 5 and the release coil L of the motor protector switch P to the negative terminal of the auxiliary source. The protector switch drops out, and the motor stops.

Alternatively, the switch b3 may be replaced by a normally closed switch connected in series with the push-button contacts STOP and arranged to break the circuit at over-normal rates of rotation. In that case, the contactor in the operated condition will be caused to drop out, while the protector switch remains in the operated condition.

In the apparatus described, it may happen that one or the other of the contactors remain in the operated condition when its holding circuit is broken. This fault may be caused, for instance, by the sticking of one of the movable contacts of the contactor to the corresponding stationary contact. It may also happen that the limit switch G or another of the break contacts in the holding circuits of the contactors gets out of order, with the result that it does not perform the desired breaking of the circuit. It is now assumed that a fault of this kind has occurred, and that the door and the shaft A are being checked or are moving at a lower-than-normal speed and rate of rotation, respectively, the door having attained one of its terminal positions or encountering an obstacle or abnormal resistance. The monitoring device B operates its switches b1 and b2. If the contacts of the contactor N are closed, the switch b1 closes the energizing circuit of the relay E extending through the signal contact n3 of the contactor N. The relay E operates, closing its contact e1. If the contacts of the contactor U are closed, the switch b2 closes the energizing circuit of the relay F extending through the signal contact u3 of the contactor U. The relay F operates, closing its contact f1. The closing of any of the contacts e1 and f1 supplies a positive potential to the input of the time circuit D. If the period during which the positive potential remains exceeds the period to which the time circuit D is set, the time circuit will operate its switch d1 to close an energizing circuit for the release coil L of the motor protector switch P, said circuit extending from the positive terminal of the auxiliary source through the switch d1, the conductor 5 and the coil L to the negative terminal of the auxiliary source. The motor protector switch drops out.

I claim:

1. Apparatus for operating a vertically movable door comprising an electric motor; a friction clutch comprising a driving member and a driven member; a first transmission means connecting the motor with said driving member; said transmission means connecting said driven member with the door; circuit means for connecting the motor to a source of power, said circuit means including a first switch arranged to connect the motor for rotation in the direction causing closing of the door, a second switch aranged to connect the motor for rotation in the direction causing opening of the door, and a third switch connected in series with said first and second switches; a stop member arranged to prevent the door from moving beyond a predetermined fully-open terminal position; automatic means for switching off the motor from the source of power on arrival of the door to said terminal position, said automatic means including means for sensing the rotation of a rotary part of said second transmission means, means arranged to produce a first signal responsive to the sensing by said sensing means of a deviation of the rate of rotation downward from a predetermined range, and control means responsive to said first signal for causing said second switch to be restored to its open-circuit condition; means for automatically reversing the motor when the door upon closing encounters an obstruction, said means including means for sensing the state of said first switch and for producing a second signal when sensing the closed state of said first switch, and a gate arranged to be controlled by said first and second signals and to respond to the simultaneous reception of said first and second signals by producing a third signal, control means responsive to said third signal for causing said switch to be restored to its open condition, and delayed control means responsive to said third signal for closing said second switch, and means sensing the state of the motor circuit and for producing, when sensing the closed state of the motor circuit, a signal circuit condition indicative of said closed state, a second and gate arranged to respond to the simultaneous presence of said signal circuit condition and said first signal by producing a fourth signal, a time delay circuit arranged to be controlled by said fourth signal and to cause said third switch to be opened when said fourth signal has lasted a predetermined time.

* * * * *